Nov. 16, 1943. T. H. STANCLIFF 2,334,359
SIDE CUTTER BEARING
Filed Nov. 23, 1940
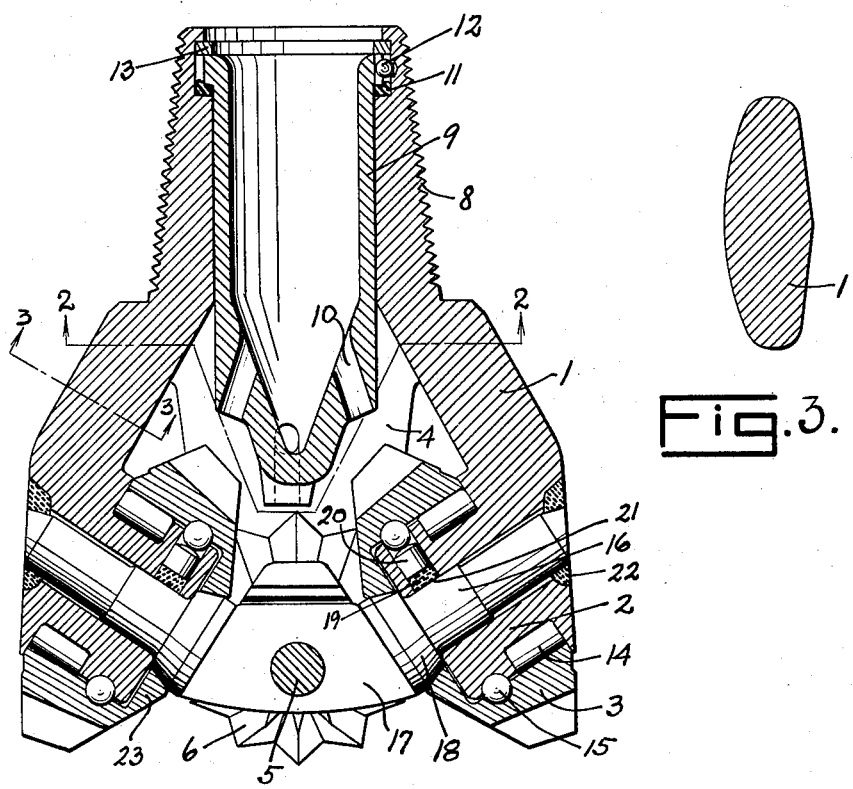
Fig.3.
Fig.1.
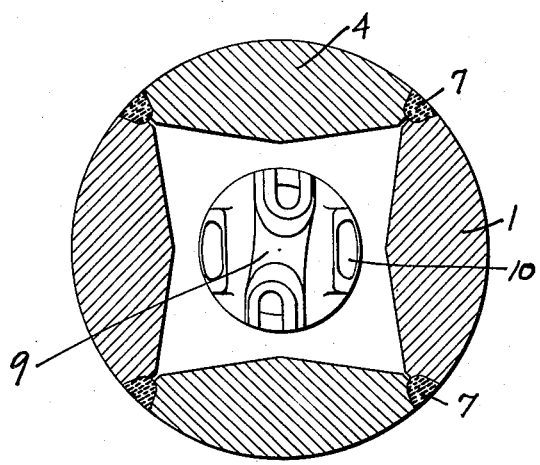
Fig.2.
INVENTOR.
Thomas H. Stancliff.
By J. Vincent Martin
and
Ralph R. Browning
ATTORNEYS Patented Nov. 16, 1943

2,334,359

UNITED STATES PATENT OFFICE 2,334,359

SIDE CUTTER BEARING

Thomas H. Stancliff, Houston, Tex., assignor to Reed Roller Bit Company, Houston, Tex., a corporation of Texas Application November 23, 1940, Serial No. 366,816

2 Claims. (Cl. 255—71)

This invention relates generally to a drill bit of the type employing roller cutters, and particularly to that type of drill bit known as a cross roller bit. The general object of this invention is to provide an improved bearing structure for those cutters of a roller bit which cut at both the sides and bottom of a hole.

A cross roller bit consists generally of a hollow head having a cross pin extending substantially diametrically across the bottom of the head and carrying a pair of opposed cross roller cutters. This pin may be either horizontal or its two portions on the opposite sides of the bit head may be inclined somewhat either upwardly or downwardly. Mounted on downwardly inclined axes on opposite sides of the cross pin and in planes at substantially right angles to the cross roller cutters are a pair of side cutters, the lower and outer extremities of these cutters projecting beyond the outer contour of the bit head, so as to cut at the sides and bottom of a hole and determine the gauge of a hole.

Heretofore, great difficulty has been encountered in providing a sufficient amount of bearing for these side cutters and for similar cutters in other types of roller bits. Various means have been employed for strengthening the bearings of such cutters, such as by extending a bridge between the inner ends of such bearings, such bridge usually being in engagement at its center with the cross pin between the cross cutters. Roller bearings have been employed for the purpose of taking the radial load on such cutters and ball thrust bearings have been employed for the purpose of taking the forces exerted upon the cutter in a direction parallel to its axis. However, due to the fact that such cutters are necessarily of relatively small extent along their own axes, it has been found that the employment of a single row of roller bearings alongside of a row of ball bearings has been unsatisfactory because under such circumstances the balls take so large a percent of the radial load that they soon become worn and fail to take the thrust load.

It is an object of this invention to provide a bearing which will be better able to take both the radial and thrust load imposed on these side cutters.

Another object of this invention is to provide a structure in which an additional bearing of short radial extent will be provided for the purpose of preventing excessive wear on the thrust antifriction bearings and for the purpose of assisting in taking both the radial and thrust load on the cutter.

Other objects and advantages will become apparent from the following description taken in connection with the accompanying drawing wherein one example of this invention is illustrated.

In the drawing:

Fig. 1 is a longitudinal cross section through a bit constructed in accordance with this invention, the same being taken substantially in the plane of the axes of the side cutters.

Fig. 2 is a transverse cross section of the same structure taken along the line of 2—2 of Fig. 1.

Fig. 3 is a transverse cross section through one of the legs of the bit head shown in Fig. 1 and taken along the line 3—3 of Fig. 1.

The bit head illustrated in the drawing is formed of four parts or segments, two of which provide legs 1 for supporting the bearing shaft 2 for the side cutters 3. The other two segments provide legs 4 for supporting the outer ends of the cross roller bearing pin 5 which carries the cross roller cutters 6.

The segments 1 and 4 are joined along their edges by any suitable means such as the welding 7 and threads 8 are formed on the outer surface of the shank of this head whereby the head may be secured to a drill stem. For the purpose of providing for the distribution of the drilling fluid, which is pumped through the drill stem during drilling, so that this drilling fluid will be properly distributed to the various cutters, there is provided a slush nozzle assembly in the form of a tubular member 9 which fits within the shank of the bit head and has nozzles 10 at its lower end for directing the slush in a direction desired. The upper end of the nozzle assembly is sealed to the shank of the bit head by means of a suitable sealing ring 11 and is prevented from turning on its seat by means of a suitable key, which in this instance is in the form of a ball 12. The slush nozzle assembly is held in place by a split locking ring 13, which is snapped into place after the nozzle assembly is put in place.

The bearing shafts 2 for the side cutters are provided on their outer surfaces with roller bearing races for the purpose of receiving the rollers 14 and with ball races for the purpose of receiving the balls 15. These bearing shafts are also made hollow so as to receive the reduced ends 16 of the bridge member 17. This bridge member is provided adjacent the ends of the side cutter bearing shafts 2 with tapered frictional bearing surfaces 18, these surfaces being tapered toward the bearing shafts 2. The bearing shafts 2 are also provided with passages 19 through which the balls 15 may be put in place, and after the balls 15 are put in place the passages 19 are closed by plugs 20 welded in place as shown at 21. The ends of the bridge 17 are welded in place as shown at 22.

Each of the side cutters is provided on its inner surface with portions serving as races for the rollers 14 and the balls 15, and in addition to these each of the side cutters is provided with an overhanging inwardly extending flange 23 having a tapered frictional bearing surface on its inner edge adapted to cooperate with the frictional bearing surfaces 18 on the bridge. It will be seen that because of the tapered formation of this frictional bearing surface, it will serve to take a portion of the inward thrust on the side cutters, and inasmuch as this is the thrust which in practice is most apt to predominate, this frictional bearing surface will serve to assist the thrust ball bearings 15 in performing their function. At the same time, these frictional bearing portions will provide additional radial bearing support and will provide the same on the opposite side of the thrust balls 15 from the main radial bearing 14. Thus, there will be a radial bearing on both sides of the thrust ball bearing and this will serve to take off the thrust ball bearing substantially its entire radial load.

It will be noted that by the arrangement just described, the additional bearing necessary for the support of the side cutters is provided, yet it is placed adjacent the axes of these cutters where there is the most room for providing such a bearing. In many designs it would be impossible to provide such a bearing of the same radial size as the roller and ball bearings illustrated.

In assembling the device above described, the cross cutters are put in place on their respective pins and the side cutters are mounted on their bearing shafts 2, the balls 15 being put in place and secured in place by the plugs 20 and the welding 21. The ends of the bridge are then inserted through the bearing shafts 2 and the segments carrying the cross cutters are assembled with respect to the bridge and the other segments. After all this has been done, the bridge is welded in place and the segments welded together along the shank of the bit body as illustrated in Fig. 2. Thereafter, the threads 8 are cut and the slush nozzle assembly 9 is put in place and secured in the bit head.

It will be seen that a means has been provided for securing the bearing support necessary for the side cutters of a cross roller bit and for carrying out the various objects of this invention.

It will further be seen that while this invention is illustrated and described in connection with a cross roller bit construction and is particularly advantageous in such structure, it is also applicable to other types of roller bits employing side roller cutters for cutting at the sides and bottom of a hole. In the appended claims, therefore, the term "side cutter" is not to be construed as a limitation to the cross roller type of bit, but is to be construed as relating to any type of bit having side roller cutters for cutting at the sides and bottom of a hole.

Having described my invention, I claim:

1. In a cross roller bit head having cross roller cutters mounted at the lower portion thereof with their axis lying substantially diametrically across the bottom of said head, side cutter bearing shafts carried by the lower portion of said bit head and extending inwardly toward the center of the head and toward each other, the axes of said side cutter shafts lying in a plane containing the axis of the bit head and lying perpendicularly to the axis of the cross cutters, each of said side cutter bearing shafts having a cylindrical bearing surface and an axial bore extending therethrough, a side cutter roller on each side cutter shaft, each of said side cutter rollers having a cylindrical bore therein to receive its shaft, and a bridge extending between said side cutter shafts and having ends extending into and secured in the bores in said side cutter shafts, the improvement comprising a flange on the inner ends of the side cutter rollers inwardly of the inner ends of the side cutter shafts and extending radially toward the axis of said side cutter rollers, each of said flanges having a tapered opening therein which increases in diameter inwardly of the bit head, said bridge having frusto conical friction bearings extending into and engaging said tapered openings in said flanges, a roller bearing between each shaft and the side cutter thereon at the outermost end of the cutters, and a ball bearing between each shaft and the side cutter thereon between the flange and the roller bearing.

2. In a cross roller bit head having cross roller cutters mounted at the lower portion thereof with their axes lying substantially diametrically across the bottom of said head, side cutter bearing shafts carried by the lower portion of said bit head and extending inwardly toward the center of the head and toward each other, the axes of said side cutter shafts lying in a plane containing the axis of the bit head and lying perpendicularly to the axis of the cross cutters, each of said side cutters bearing shafts having a bearing surface, a side cutter roller on each side cutter shaft, each of said side cutter rollers having a bore therein to receive its shaft, a roller bearing between each side cutter roller and its shaft at the most remote outer ends of said rollers, a ball bearing between each side cutter roller and its shaft at the innermost portions of said shafts, the improvement comprising a flange on the inner ends of the side cutter rollers inwardly of the inner ends of the side cutter shafts and extending radially toward the axis of said side cutter rollers, each of said flanges having a tapered opening therein which increases in diameter inwardly of the bit head, and means extending between the inner ends of said side cutter shafts and including frusto conical friction bearing shafts extending into and engaging the tapered openings in said flanges.

THOMAS H. STANCLIFF.